United States Patent
Goodzeit

(10) Patent No.: US 6,702,234 B1
(45) Date of Patent: Mar. 9, 2004

(54) FAULT TOLERANT ATTITUDE CONTROL SYSTEM FOR ZERO MOMENTUM SPACECRAFT

(75) Inventor: Neil Evan Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/108,571

(22) Filed: Mar. 29, 2002

(51) Int. Cl.[7] .............................. B64G 1/24; B64G 1/36
(52) U.S. Cl. ...................... 244/164; 244/171; 244/195
(58) Field of Search .................. 244/164, 165, 244/171, 194, 195; 701/13, 4, 226

(56) References Cited

U.S. PATENT DOCUMENTS

| | | |
|---|---|---|
| 3,813,067 A | 5/1974 | Mork |
| 4,062,509 A | 12/1977 | Muhlfelder et al. |
| 4,071,211 A | 1/1978 | Muhlfelder et al. |
| 4,219,940 A * | 9/1980 | Okubo .................. 33/366.24 |
| 4,537,375 A | 8/1985 | Chan |
| 4,654,846 A | 3/1987 | Goodwin et al. |

(List continued on next page.)

FOREIGN PATENT DOCUMENTS

| | | |
|---|---|---|
| EP | 0499815 | 8/1992 |
| EP | 0568209 | 11/1993 |
| EP | 0604214 | 6/1994 |
| EP | 0780298 | 6/1997 |
| EP | 0922635 | 6/1999 |
| EP | 0937644 | 8/1999 |
| EP | 1024082 | 8/2000 |
| JP | 321597 | 11/2000 |

OTHER PUBLICATIONS

Voss, L., "New Thrust for U.S. Satellites", Aerospace America, American Institute of Aeronautics & Astronautics, New York, vol. 38, No. 2, Feb. 2000, pp. 36–40.

"Electric Propulsion", Aerospace America, American Institute of Aeronautics & Astronautics, New York, vol. 30, No. 12, Dec. 1, 1992, p. 42.

Anzel, B., "Stationkeeping the Hughes HS 702 Satellite with a Xenon Ion Propulsion System," Congress of the International Astronautical Federation, Sep. 28, 1998.

*Primary Examiner*—Charles T. Jordan
*Assistant Examiner*—Stephen Holzen
(74) *Attorney, Agent, or Firm*—Townsend and Townsend and Crew LLP

(57) ABSTRACT

A fault tolerant attitude control system for a zero momentum spacecraft. A zero momentum attitude control system is operable to control spacecraft attitude utilizing data received from an earth sensor, a sun sensor, and the inertial measurement unit. A gyroless attitude control system is operable to control spacecraft attitude without receiving data from the inertial measurement unit. A redundancy management system is operable to monitor an inertial measurement unit to detect faults and to reconfigure the inertial measurement unit if a fault is detected and operable to determine when an inertial measurement unit fault is resolved. A controller is operable to automatically switch the spacecraft from the zero momentum attitude control to the gyroless attitude control when a fault in the inertial measurement unit is detected and is operable to automatically switch the spacecraft from the gyroless attitude control to the zero momentum control upon resolution of the fault.

52 Claims, 2 Drawing Sheets

U.S. PATENT DOCUMENTS

| | | |
|---|---|---|
| 4,754,280 A | 6/1988 | Brown et al. |
| 4,767,084 A | 8/1988 | Chan et al. |
| 4,890,284 A * | 12/1989 | Murphy et al. ............... 714/11 |
| 5,025,381 A | 6/1991 | Goodzeit et al. |
| 5,058,835 A | 10/1991 | Goodzeit et al. |
| 5,062,051 A | 10/1991 | Sainct et al. |
| 5,080,307 A | 1/1992 | Smay et al. |
| 5,092,543 A | 3/1992 | Goodzeit |
| 5,100,084 A | 3/1992 | Rahn et al. |
| 5,123,617 A | 6/1992 | Linder et al. |
| 5,139,218 A * | 8/1992 | Bird et al. .................. 244/165 |
| 5,201,833 A | 4/1993 | Goodzeit et al. |
| 5,205,518 A * | 4/1993 | Stetson, Jr. ................ 244/165 |
| 5,248,118 A | 9/1993 | Cohen et al. |
| 5,277,385 A | 1/1994 | Flament |
| 5,284,309 A | 2/1994 | Salvatore et al. |
| 5,307,206 A * | 4/1994 | Haessig, Jr. ................ 359/555 |
| 5,308,024 A * | 5/1994 | Stetson, Jr. ................ 244/165 |
| 5,335,179 A | 8/1994 | Boka et al. |
| 5,343,398 A | 8/1994 | Goodzeit et al. |
| 5,349,532 A | 9/1994 | Tilley et al. |
| 5,354,016 A | 10/1994 | Goodzeit et al. |
| 5,400,252 A | 3/1995 | Kazimi et al. |
| 5,412,574 A | 5/1995 | Bender et al. |
| 5,424,872 A * | 6/1995 | Lecuyer et al. ............. 359/811 |
| 5,433,402 A | 7/1995 | Surauer et al. |
| 5,452,869 A | 9/1995 | Basuthakur et al. |
| 5,458,300 A | 10/1995 | Flament et al. |
| 5,546,309 A | 8/1996 | Johnson et al. |
| 5,556,058 A | 9/1996 | Bender |
| 5,562,266 A | 10/1996 | Achkar et al. |
| 5,597,142 A | 1/1997 | Leung et al. |
| 5,608,634 A | 3/1997 | Goodzeit et al. |
| 5,610,820 A * | 3/1997 | Shankar et al. ............... 701/13 |
| 5,646,847 A | 7/1997 | Ratan et al. |
| 5,654,549 A * | 8/1997 | Landecker et al. ......... 250/332 |
| 5,654,846 A * | 8/1997 | Wicks et al. ............. 360/97.01 |
| 5,687,933 A | 11/1997 | Goodzeit et al. |
| 5,692,707 A * | 12/1997 | Smay ........................ 244/165 |
| 5,738,309 A | 4/1998 | Fowell |
| 5,745,869 A * | 4/1998 | van Bezooijen ............ 701/222 |
| 5,749,545 A | 5/1998 | Gnatjuk |
| 5,765,780 A | 6/1998 | Barskey et al. |
| 5,799,904 A | 9/1998 | Goodzeit et al. |
| 5,806,804 A | 9/1998 | Goodzeit et al. |
| 5,813,633 A | 9/1998 | Anzel |
| 5,845,880 A | 12/1998 | Petrosov et al. |
| 5,931,421 A | 8/1999 | Surauer et al. |
| 5,984,236 A | 11/1999 | Keitel et al. |
| 5,984,237 A * | 11/1999 | Goodzeit .................... 244/169 |
| 5,996,941 A | 12/1999 | Surauer et al. |
| 6,026,337 A | 2/2000 | Krigbaum et al. |
| 6,032,904 A | 3/2000 | Hosick et al. |
| 6,039,290 A * | 3/2000 | Wie et al. ................... 244/165 |
| 6,047,927 A * | 4/2000 | Heiberg et al. ............. 244/165 |
| 6,089,507 A | 7/2000 | Parvez et al. |
| 6,102,337 A | 8/2000 | Quartararo |
| 6,108,594 A | 8/2000 | Didinsky et al. |
| 6,116,543 A | 9/2000 | Koppel |
| 6,145,790 A | 11/2000 | Didinsky et al. |
| 6,213,432 B1 | 4/2001 | Koppel |
| 6,260,805 B1 | 7/2001 | Yocum, Jr. et al. |
| 6,282,467 B1 | 8/2001 | Shah et al. |
| 6,285,927 B1 | 9/2001 | Li et al. |
| 6,285,928 B1 | 9/2001 | Tilley et al. |
| 6,292,722 B1 | 9/2001 | Holmes et al. |
| 6,296,207 B1 | 10/2001 | Tilley et al. |
| 6,314,344 B1 | 11/2001 | Sauer et al. |
| 6,327,523 B2 | 12/2001 | Cellier |
| 6,336,062 B1 | 1/2002 | Yamashita |
| 6,356,815 B1 | 3/2002 | Wu et al. |
| 6,381,520 B1 | 4/2002 | Highham et al. |
| 6,389,336 B2 | 5/2002 | Cellier |
| 6,442,385 B1 | 8/2002 | Marko |
| 6,470,243 B1 | 10/2002 | Eyerly et al. |
| 6,481,672 B1 | 11/2002 | Goodzeit et al. |
| 2002/0119750 A1 | 8/2002 | Youssefi |

\* cited by examiner

FAULT TOLERANT ATTITUDE CONTROL SYSTEM FOR ZERO MOMENTUM SPACECRAFT

FIELD OF THE INVENTION

This invention concerns a system and method for spacecraft autonomous recovery from Inertial Measurement Unit (IMU) failure events. During the failure event and recovery, the system maintains payload pointing to prevent any disruption to mission operations.

BACKGROUND OF THE INVENTION

Three-axis zero momentum attitude control architectures have gained popularity as the size and complexity of communications spacecraft have grown. Such systems offer improved payload pointing and can accommodate a diverse range of payload antenna configurations. For a zero-momentum system, pointing control is provided by sensing three-axis attitude using attitude sensors such as earth sensors and sun sensors. Three-axis angular rates are typically measured by an Inertial Measurement Unit (IMU) that includes at least three gyros. Attitude control torques are applied using reaction wheels or thrusters in response to sensed attitude and rate errors to maintain earth pointing control. Typically, data from the earth sensor, which provides roll and pitch, is available continuously. Sun sensor data, which provides yaw information, is available intermittently. The angular rate data must be available continuously to maintain attitude control, as this data is used to propagate the three-axis inertial attitude and provide rate feedback information.

Typically, a spacecraft will include a redundancy management system that monitors the health of on-board equipment to detect and correct failure conditions. If a failure is detected, a backup or redundant component is activated to replace the function performed by the failed component. If an IMU failure occurs, the IMU is reconfigured to switch to a redundant power supply, processor, or gyro. During the period of the switch and immediately afterwards, valid angular rate data will not be available, and attitude control cannot be maintained using the normal three-axis zero-momentum approach.

Prior art systems use several methods to solve this problem. One approach is to "coast" through the data interruption, by disabling the closed-loop attitude control system for the outage period. The drawback of this approach is that if data validity is not restored within some short interval, the spacecraft will lose earth-pointing control, thereby disrupting mission operations. Another approach is to use two IMUs that are both powered on, so that a "hot" switch can be made from the failed to the redundant unit, without interrupting the flow of valid rate data to the control system. The disadvantage of this approach is that it requires an attitude control architecture with at least two entirely separate IMUs. Such an architecture is more costly and less mass-efficient than an architecture with a singe "internally redundant" IMU.

SUMMARY OF THE INVENTION

The present invention provides a system that addresses shortcomings in known systems. The present invention provides a solution for IMU fault recovery that prevents any disruption in earth pointing, whether or not IMU failure correction is immediate. Furthermore, the system does not rely on having two or more separate IMU units.

The present invention provides a fault tolerant attitude control system for a zero momentum spacecraft. The system includes a zero momentum attitude control system operable to control spacecraft attitude utilizing data received from an earth sensor, a sun sensor, and the inertial measurement unit. The system also includes a gyroless attitude control system operable to control spacecraft attitude without receiving data from the inertial measurement unit. Additionally, the system includes a redundancy management system operable to monitor an inertial measurement unit to detect faults and to reconfigure the inertial measurement unit if a fault is detected and operable to determine when the inertial measurement unit failure is corrected and its data is again valid. Furthermore, the system includes a controller operable to automatically switch the spacecraft from the zero momentum attitude control to the gyroless attitude control when a fault in the inertial measurement unit is detected and to automatically switch the spacecraft from the gyroless attitude control to the zero momentum control upon resolution of the fault.

The present invention also includes a method for controlling attitude of a spacecraft. The method includes controlling the attitude of the spacecraft with a three-axis zero momentum attitude control system operable to control spacecraft attitude utilizing data received from an earth sensor, a sun sensor, and an inertial measurement unit. The inertial measurement unit is monitored to detect faults. The inertial measurement unit is reconfigured if a fault is detected. Attitude control of the spacecraft is switched from the zero momentum attitude control to the gyroless attitude control when a fault in the inertial measurement unit is detected. The gyroless attitude control system is operable to control spacecraft attitude without receiving data from the inertial measurement unit. Attitude control of the spacecraft is switched from the gyroless attitude control to the zero momentum attitude control when a fault in the inertial measurement unit is corrected and its data is again valid.

The present invention also includes a spacecraft that includes an earth sensor, a sun sensor, and an inertial measurement unit. A redundancy management system is operable to monitor the inertial measurement unit to detect faults and to reconfigure the inertial measurement unit if a fault is detected and operable to determine when the inertial measurement unit failure is corrected and its data again valid. A fault tolerant attitude control system includes a zero momentum attitude control system operable to control spacecraft attitude utilizing data received from the earth sensor, the sun sensor, and the inertial measurement unit, a gyroless attitude control system operable to control spacecraft attitude without receiving data from the inertial measurement unit. A controller is operable to automatically switch the spacecraft from the zero momentum attitude control to the gyroless attitude control when a fault in the inertial measurement unit is detected and to automatically switch the spacecraft from the gyroless attitude control to the zero momentum control upon resolution of the fault.

Still other objects and advantages of the present invention will become readily apparent by those skilled in the art from a review of the following detailed description. The detailed description shows and describes preferred embodiments of the present invention, simply by way of illustration of the best mode contemplated of carrying out the invention. As will be realized, the present invention is capable of other and different embodiments and its several details are capable of modifications in various obvious respects, without departing from the present invention. Accordingly, the drawings and description are illustrative in nature and not restrictive.

BRIEF DESCRIPTION OF THE DRAWINGS

Objects and advantages of the present invention will be more clearly understood from the following specification when considered in conjunction with the accompanying drawings, in which.

DETAILED DESCRIPTION OF THE INVENTION

The system includes a redundancy management RED-MAN system that monitors the health and operating integrity of the IMU. In the event that an IMU failure is detected, the REDMAN system may switch the IMU's internal configuration and automatically activate a gyroless pointing control mode. This gyroless attitude control mode is described in a co-pending U.S. patent application Ser. No. 10/108,626 filed on Mar. 29, 2002 entitled "Gyroless Control System for Zero-Momentum Three-Axis Stabilized Spacecraft", the entire contents of the disclosure of which is hereby incorporated by reference. The gyroless control mode co-exists with the normal three-axis zero-momentum control system, but is normally inactive. The gyroless mode provides high-accuracy three-axis earth pointing control without the need for three-axis angular rate measurements. When the IMU failure is corrected and data validity is restored, the REDMAN system may automatically switch back to the normal gyro-based three-axis zero-momentum control. Resolution of an inertial measurement unit failure is considered to occur at the time following failure correction that data validity is determined by the REDMAN system processing. The test for data validity may rely on status information output directly by the IMU or reasonableness tests that are applied to the angular rates supplied by the IMU.

Figure 1:
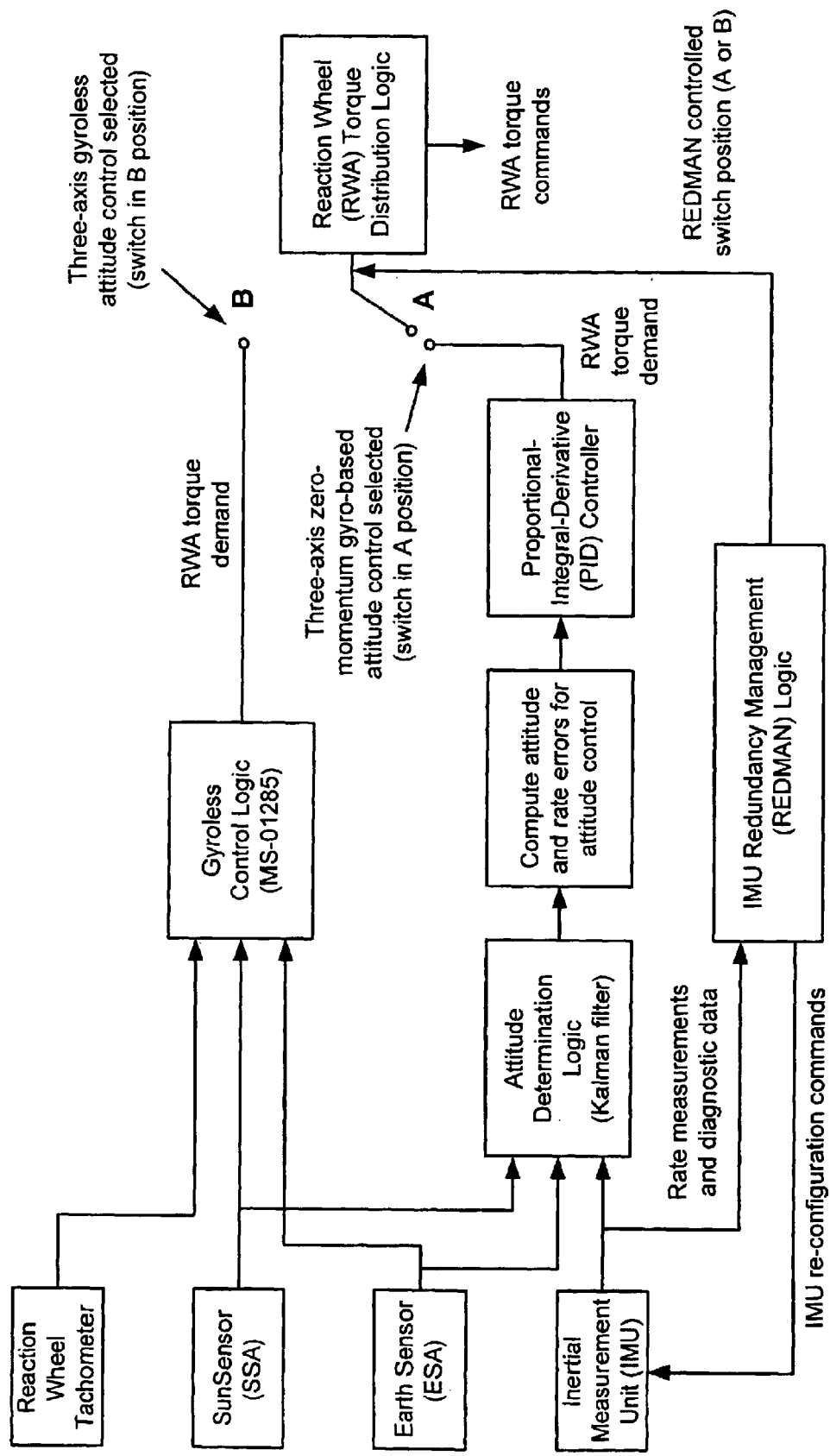
FIG. 1 represents a diagram that illustrates aspects of an embodiment of a system according to the present invention.

FIG. 1 shows a diagram that illustrates an embodiment of a fault tolerant attitude control system according to the invention. The embodiment of the system shown in FIG. 1 includes a redundancy management system (REDMAN) that monitors the IMU to detect faults and re-configure the IMU in the event that a failure is detected. This embodiment of the system also includes a three-axis zero-momentum attitude control system that operates using attitude data supplied by an earth sensor and sun sensor and three-axis angular rate data supplied by a continuously operating IMU. Additionally, this embodiment of the system includes a gyroless attitude control system that operates using attitude data supplied by an earth sensor and sun sensor, and reaction wheel (RWA) speed information, but without angular rate measurements supplied by the IMU.

Furthermore, the REDMAN system includes switching logic that activates the gyroless control mode automatically when IMU failure conditions are present. When the IMU failure is corrected and valid angular rate data is available, the REDMAN system automatically disables the gyroless control and re-enables the three-axis zero-momentum gyro-based control.

The following describes element of the embodiment of the system shown in FIG. 1 in greater detail. The REDMAN system may continuously monitor the health and status of the IMU. The monitored information includes built-in-test (BIT) data that is generated internally within the IMU, as well as the IMU angular rate outputs. The BIT data indicates the operational status of each gyro, the active power supply and processor. The rate data is subject to validity and reasonableness tests. Additionally, the REDMAN system may verify that the IMU is communicating properly over the data bus that connects the IMU to the on-board processor.

When a failure is detected, the REDMAN system may be configured to issue commands to re-configure the IMU to use redundant components. The IMU may include one redundant power supply, where one is necessary. The IMU may also include one redundant processor, where one is required for operation. Additionally, the IMU may include a single redundant gyro, where 3 gyros are typically utilized for normal operation.

Which of the redundant components are activated depends on the nature of the detected failure. After switching the IMU configuration, the REDMAN system may continue to monitor the IMU health status and data validity. Simultaneous with the IMU failure detection, the REDMAN system may activate the gyroless control mode, and deactivate the three-axis zero-momentum control mode. The gyroless mode maintains earth-pointing control without the need for spacecraft angular rate measurements.

When failure conditions are absent for a specified time, the REDMAN system may clear the failure and switch back to the gyro-based three-axis zero-momentum control mode. The mode switching and gyroless control functions may be accomplished without any significant degradation in payload pointing performance. Hence, mission operations are not disrupted during recovery from IMU failure events.

The three-axis zero-momentum attitude control system includes attitude determination processing that generates spacecraft inertial attitude estimates using attitude sensor data, such as from earth sensor and sun sensor assemblies, and gyro rate data. The gyro data may be utilized to propagate the three-axis inertial attitude. Also, the propagated attitude may be updated by a Kalman filter using the attitude sensor data. The Kalman filter may also provide estimates of the gyro rate biases.

The inertial attitude may then be used to compute attitude and rate errors for three-axis attitude control. When these errors are nulled by the control system, the spacecraft body axes become aligned with an earth-pointing coordinate frame. The attitude and rate errors may be input to a Proportional, Integral, Derivative (PID) Controller that computes the reaction wheel torque demands for attitude control. As is well known in the art, the PID controller computes the control torque as a weighted sum of the attitude error, integral of the attitude error, and the rate error. The computed torque demand may then be input to RWA torque distribution logic that computes the torque commands that are output to the RWAs.

The gyroless control system is described in greater detail in a co-pending U.S. patent application Ser. No. 10/108,626, filed on Mar. 29, 2003, entitled "Gyroless Control System for Zero-Momentum Three-Axis Stabilized Spacecraft", the entire contents of the disclosure of which is hereby incorporated by reference. This system can maintain precision three-axis attitude control while valid angular rate data is unavailable. The controller inputs may include RWA momentum on each axis and earth sensor assembly (ESA) roll and pitch angles. The input also may include sun sensor assembly (SSA) elevation angle data when it is available for several hours per orbit. The controller outputs may include RWA torque demands.

High bandwidth proportional-derivative (PD) control loops may be closed on the pitch and roll axes, using ESA angles and derived rates. These loops may use measured roll and pitch RWA momentum to derive a high-frequency pseudo rate that is used for ESA noise attenuation while maintaining the required stability margins for the high-bandwidth roll and pitch control.

The control structure in roll and pitch may be similar to a standard zero-momentum control approach. Yaw control may be accomplished indirectly using a small positive pitch momentum stored in the reaction wheels. The positive pitch momentum may be on the order of about 80 to about 200 in-lb-sec. More typically, positive pitch is about 100 to about 200 in-lb-sec. This momentum may be maintained at all times during gyro-based operations, so it is available in the event that the gyroless control system must be activated.

To control yaw, the standard PID controller may be disabled while three loops are closed. The first two closed control loops may be gyroscopic torque canceling crossfeeds from roll RWA momentum to yaw RWA torque, and from yaw RWA momentum to roll RWA torque. A third loop closure from ESA roll angle to RWA yaw torque may be used to damp a yaw/roll coupling mode that arises from the gyroscopic crossfeeds and the roll PD control.

The performance of the gyroless system may be further enhanced by applying estimates of the inertial component of the yaw and roll environmental disturbance torques to the RWAs. These disturbance torques may be output by an estimator that may operate utilizing the RWA speed data. Additionally, when sun sensor data is available, a yaw PD loop may be closed using yaw angle and rate derived from the SSA elevation angle data. Also, during gyroless operation, the spacecraft inertial-to-body quaternion may be preserved by propagating it using the known angular rate of the orbit frame relative to the inertial frame based on the spacecraft ephemeris model.

Figure 2:
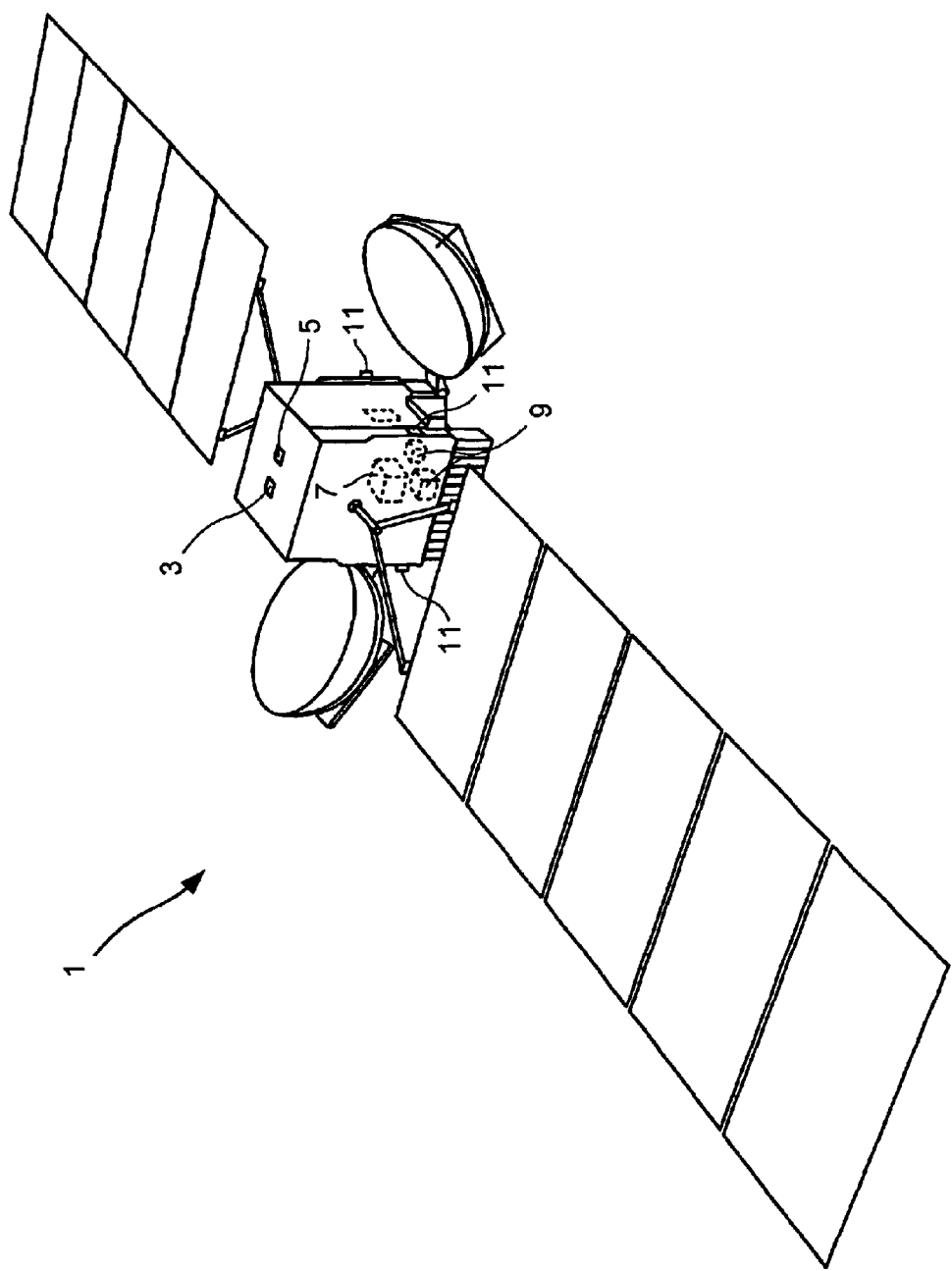
FIG. 2 represents a perspective view of an embodiment of a satellite according to the present invention.

FIG. 2 illustrates an embodiment of a spacecraft according to the present invention. The spacecraft 1 shown in FIG. 2 includes an earth sensor 3, sun sensor 5, IMU 7, reaction wheels 9, and thrusters 11.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. An attitude control system for a zero-momentum spacecraft, the system comprising:
   a zero-momentum attitude control system operable to control spacecraft attitude utilizing data received from one or more attitude sensors, and an inertial measurement unit;
   a gyroless attitude control system operable to control spacecraft attitude without receiving data from the inertial measurement unit;
   a redundancy management system operable to monitor the inertial measurement unit to detect faults and to reconfigure the inertial measurement unit if a fault is detected and operable to determine when an inertial measurement unit fault is resolved; and
   a controller operable to automatically switch the spacecraft from the zero-momentum attitude control to the gyroless attitude control when a fault in the inertial measurement unit is detected and to automatically switch the spacecraft from the gyroless attitude control to the zero momentum control upon resolution of the fault.

2. The system according to claim 1, wherein the gyroless attitude control system controls spacecraft attitude utilizing data received from the one or more attitude sensors and from a reaction wheel assembly.

3. The system according to claim 1, wherein the redundancy management system continuously monitors the inertial measurement unit.

4. The system according to claim 1, wherein the redundancy management system monitors at least one of gyro operational status, power supply, processor, angular rate outputs, and communication between the inertial measurement unit and an on-board processor.

5. The system according to claim 1, wherein the inertial measurement unit includes one or more redundant components selected from the group consisting of a redundant power supply, a redundant processor and a redundant gyro.

6. The system according to claim 1, wherein the gyroless attitude control system produces reaction wheel assembly torque demands.

7. The system according to claim 1, wherein the gyroless attitude control system comprises a plurality of closed attitude control loops.

8. The system according to claim 7, wherein two of the closed control loops comprise:
   a first gyroscopic torque canceling crossfeed from roll reaction wheel assembly momentum to yaw reaction wheel assembly torque;
   a second gyroscopic torque canceling crossfeed from yaw reaction wheel assembly momentum to roll reaction wheel assembly torque; and
   a loop closure from earth sensor assembly roll angle to reaction wheel assembly yaw torque operable to damp a yaw/roll coupling mode that arises from the gyroscopic crossfeeds and a roll proportional-derivative control.

9. The system according to claim 7, wherein a yaw proportional-derivative loop is closed using a yaw angle and a rate derived from sun sensor assembly elevation angle data.

10. The system according to claim 1, wherein the gyroless attitude control system comprises an estimator operable to estimate an inertial component of yaw and roll environmental disturbance torques.

11. The system according to claim 1, wherein the gyroless attitude control system is operable to preserve a spacecraft inertial-to-body quaternion by propagating the quaternion using a known angular rate of an orbit frame relative to an inertial frame based on a spacecraft ephemeris model.

12. A method for controlling attitude of a spacecraft, the method comprising:
   controlling the attitude of the spacecraft with a three-axis zero-momentum attitude control system operable to control spacecraft attitude utilizing data received from one or more attitude sensors and an inertial measurement unit;

monitoring the inertial measurement unit to detect faults;

reconfiguring the inertial measurement unit if a fault is detected;

switching attitude control of the spacecraft from the zero-momentum attitude control to the gyroless attitude control when a fault in the inertial measurement unit is detected, the gyroless attitude control system operable to control spacecraft attitude without receiving data from the inertial measurement unit;

determining when an inertial measurement unit fault is resolved; and switching attitude control of the spacecraft from the gyroless attitude control to the zero-momentum attitude control when a fault in the inertial measurement unit is resolved.

13. The method according to claim 12, wherein gyroless attitude control comprises utilizing data received from the one or more attitude sensors and from a reaction wheel assembly.

14. The method according to claim 12, wherein the inertial measurement unit is continuously monitored to detect faults.

15. The method according to claim 12, wherein the inertial measurement unit is monitored for at least one of gyro operational status, power supply, processor, angular rate outputs, and communication between the inertial measurement unit and an on-board processor.

16. The method according to claim 12, further comprising: switching the inertial measurement unit to at least one of a redundant power supply, a redundant processor and a redundant gyro upon detecting a fault.

17. The method according to claim 12, wherein gyroless attitude control produces reaction wheel assembly torque demands.

18. The method according to claim 12, wherein gyroless attitude control comprises a plurality of closed attitude control loops.

19. The method according to claim 18, wherein two of the closed control loops comprise:

a first gyroscopic torque canceling crossfeed from roll reaction wheel assembly momentum to yaw reaction wheel assembly torque;

a second gyroscopic torque canceling crossfeed from yaw reaction wheel assembly momentum to roll reaction wheel assembly torque; and a loop closure from earth sensor assembly roll angle to reaction wheel assembly yaw torque operable to damp a yaw/roll coupling mode that arises from the gyroscopic crossfeeds and a roll proportional-derivative control.

20. The method according to claim 18, wherein a yaw proportional-derivative loop is closed using a yaw angle and a rate derived from sun sensor assembly elevation angle data.

21. The method according to claim 12, further comprising:

estimating an inertial component of yaw and roll environmental disturbance torques.

22. The method according to claim 12, wherein gyroless attitude control is operable to preserve a spacecraft inertial-to-body quaternion by propagating the quaternion using a known angular rate of an orbit frame relative to an inertial frame based on a spacecraft ephemeris model.

23. A spacecraft, comprising:

one or more attitude sensors;

an inertial measurement unit;

a redundancy management system operable to monitor the inertial measurement unit to detect faults;

an attitude control system comprising;

a zero-momentum attitude control system operable to control spacecraft attitude utilizing data received from the one or more attitude sensors and the inertial measurement unit;

a gyroless attitude control system operable to control spacecraft attitude without receiving data from the inertial measurement unit; and a controller operable to automatically switch the spacecraft from the zero-momentum attitude control to the gyroless attitude control when a fault in the inertial measurement unit is detected.

24. The spacecraft as recited in claim 23, wherein the one or more attitude sensors comprises one or more attitude sensors selected from the group consisting of an earth sensor, a sun sensor and a star sensor.

25. The spacecraft as recited in claim 23, wherein the redundancy management system is further operable to reconfigure the inertial measurement unit to resolve the fault if a fault is detected and to determine when the inertial measurement unit fault is resolved.

26. The spacecraft as recited in claim 25, wherein the controller is further operable to automatically switch the spacecraft from the gyroless attitude control to the zero-momentum control upon resolution of the fault.

27. The spacecraft as recited in claim 23, wherein the gyroless attitude control system controls spacecraft attitude utilizing data received from the one or more attitude sensors and from a reaction wheel assembly.

28. The spacecraft as recited in claim 23, wherein the redundancy management system continuously monitors the inertial measurement unit.

29. The spacecraft as recited in claim 23, wherein the redundancy management system monitors at least one of gyro operational status, power supply, processor, angular rate outputs, and communication between the inertial measurement unit and an on-board processor.

30. The spacecraft as recited in claim 23, wherein the inertial measurement unit includes one or more redundant components selected from the group consisting of a redundant power supply, a redundant processor and a redundant gyro.

31. The spacecraft as recited in claim 23, wherein the gyroless attitude control system produces reaction wheel assembly torque demands.

32. The spacecraft as recited in claim 23, wherein the gyroless attitude control system comprises a plurality of closed attitude control loops.

33. The spacecraft as recited in claim 32, wherein two of the closed control loops comprise:

a first gyroscopic torque canceling crossfeed from roll reaction wheel assembly momentum to yaw reaction wheel assembly torque;

a second gyroscopic torque canceling crossfeed from yaw reaction wheel assembly momentum to roll reaction wheel assembly torque; and a loop closure from earth sensor assembly roll angle to reaction wheel assembly yaw torque operable to damp a yaw/roll coupling mode that arises from the gyroscopic crossfeeds and a roll proportional-derivative control.

34. The spacecraft as recited in claim 32, wherein a yaw proportional-derivative loop is closed using a yaw angle and a rate derived from sun sensor assembly elevation angle data.

35. The spacecraft as recited in claim 23, wherein the gyroless attitude control system comprises an estimator operable to estimate an inertial component of yaw and roll environmental disturbance torques.

36. The spacecraft as recited in claim 23, wherein the gyroless attitude control system is operable to preserve a spacecraft inertial-to-body quaternion by propagating the quaternion using a known angular rate of an orbit frame relative to an inertial frame based on a spacecraft ephemeris model.

37. The attitude control system as recited in claim 1, wherein the one or more attitude sensors comprises one or more attitude sensors selected from the group consisting of an earth sensor, a sun sensor and a star sensor.

38. The method as recited in claim 12, wherein the one or more attitude sensors comprises one or more attitude sensors selected from the group consisting of an earth sensor, a sun sensor and a star sensor.

39. An attitude control system, comprising:
a zero-momentum attitude control system operable to control spacecraft attitude utilizing data received from one or more attitude sensors and an inertial measurement unit;
a gyroless attitude control system operable to control spacecraft attitude without receiving data from the inertial measurement unit;
a redundancy management system operable to monitor the inertial measurement unit to detect faults; and
a controller operable to automatically switch the spacecraft from the zero-momentum attitude control to the gyroless attitude control when a fault in the inertial measurement unit is detected.

40. The attitude control system as recited in claim 39, wherein the one or more attitude sensors comprises one or more attitude sensors selected from the group consisting of an earth sensor, a sun sensor and a star sensor.

41. The attitude control system as recited in claim 39, wherein the redundancy management system is further operable to reconfigure the inertial measurement unit to resolve the fault if a fault is detected and to determine when the inertial measurement unit fault is resolved.

42. The attitude control system as recited in claim 41, wherein the controller is further operable to automatically switch the spacecraft from the gyroless attitude control to the zero-momentum control upon resolution of the fault.

43. The attitude control system as recited in claim 39, wherein the gyroless attitude control system controls spacecraft attitude utilizing data received from the one or more attitude sensors and from a reaction wheel assembly.

44. The attitude control system as recited in claim 39, wherein the redundancy management system continuously monitors the inertial measurement unit.

45. The attitude control system as recited in claim 39, wherein the redundancy management system monitors at least one of gyro operational status, power supply, processor, angular rate outputs, and communication between the inertial measurement unit and an on-board processor.

46. The attitude control system as recited in claim 39, wherein the inertial measurement unit includes one or more redundant components selected from the group consisting of a redundant power supply, a redundant processor and a redundant gyro.

47. The attitude control system as recited in claim 39, wherein the gyroless attitude control system produces reaction wheel assembly torque demands.

48. The attitude control system as recited in claim 39, wherein the gyroless attitude control system comprises a plurality of closed attitude control loops.

49. The attitude control system as recited in claim 48, wherein two of the closed control loops comprise:
a first gyroscopic torque canceling crossfeed from roll reaction wheel assembly momentum to yaw reaction wheel assembly torque;
a second gyroscopic torque canceling crossfeed from yaw reaction wheel assembly momentum to roll reaction wheel assembly torque; and
a loop closure from earth sensor assembly roll angle to reaction wheel assembly yaw torque operable to damp a yaw/roll coupling mode that arises from the gyroscopic crossfeeds and a roll proportional-derivative control.

50. The attitude control system as recited in claim 48, wherein a yaw proportional-derivative loop is closed using a yaw angle and a rate derived from sun sensor assembly elevation angle data.

51. The attitude control system as recited in claim 39, wherein the gyroless attitude control system comprises an estimator operable to estimate an inertial component of yaw and roll environmental disturbance torques.

52. The attitude control system as recited in claim 39, wherein the gyroless attitude control system is operable to preserve a spacecraft inertial-to-body quaternion by propagating the quaternion using a known angular rate of an orbit frame relative to an inertial frame based on a spacecraft ephemeris model.

* * * * *